United States Patent
Wu et al.

(10) Patent No.: US 8,164,890 B2
(45) Date of Patent: Apr. 24, 2012

(54) SLIDING AND TILTING MECHANISM AND PORTABLE ELECTRONIC DEVICE USING THE SAME

(75) Inventors: Ke-Long Wu, Shenzhen (CN); Chao Duan, Shenzhen (CN); Chia-Hua Chen, Taipei (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 156 days.

(21) Appl. No.: 12/819,289

(22) Filed: Jun. 21, 2010

(65) Prior Publication Data
US 2011/0096479 A1 Apr. 28, 2011

(30) Foreign Application Priority Data
Oct. 22, 2009 (CN) .......................... 2009 1 0308620

(51) Int. Cl.
*H05K 5/00* (2006.01)
*G09G 5/00* (2006.01)
*G06F 3/033* (2006.01)
*H04M 1/00* (2006.01)

(52) U.S. Cl. ......... 361/679.21; 361/679.26; 361/679.27; 361/679.28; 361/679.29; 361/679.3; 361/679.56; 345/156; 345/168; 345/169; 455/575.1; 455/575.3; 455/575.4; 455/575.8

(58) Field of Classification Search ............. 361/679.01, 361/679.02, 679.08, 679.09, 679.21–679.3, 361/679.55–679.59; 345/156, 157, 168, 345/169, 184; 455/575.1, 575.3, 575.4, 575.8; 369/282, 291, 253, 44.16, 75.5
See application file for complete search history.

(56) References Cited

U.S. PATENT DOCUMENTS

| 2008/0174942 A1* | 7/2008 | Yang et al. | .................... 361/680 |
| 2010/0035669 A1* | 2/2010 | Jang et al. | .................. 455/575.4 |
| 2010/0149733 A1* | 6/2010 | Luke et al. | ............... 361/679.01 |

* cited by examiner

*Primary Examiner* — Robert J Hoffberg
*Assistant Examiner* — Jerry Wu
(74) *Attorney, Agent, or Firm* — Altis Law Group, Inc.

(57) ABSTRACT

A portable electronic device is disclosed including a first part, a second part, and a sliding and tilting mechanism. The sliding and tilting mechanism includes a lower board fixed to the second part, an upper board fixed to the first part, an intermediate board positioned between the lower board and the upper board. The sliding and tilting mechanism further includes two elastic assemblies and a tilting assembly, and tilts the intermediate board and the upper board relative to the lower board after the upper board slides over a predetermined distance along the intermediate board.

16 Claims, 6 Drawing Sheets

SLIDING AND TILTING MECHANISM AND PORTABLE ELECTRONIC DEVICE USING THE SAME

CROSS-REFERENCE TO RELATED APPLICATION

This application is related to co-pending U.S. Patent Application, entitled "SLIDING AND TILTING MECHANISM AND PORTABLE ELECTRONIC DEVICE USING THE SAME", by Duan et al., which has the same assignee as the present application. The above-identified application is incorporated herein by reference.

BACKGROUND

1. Technical Field

The present disclosure relates to a sliding and tilting mechanism and a portable electronic device using the mechanism.

2. Description of Related Art

Conventional portable electronic devices can be classified into three different categories, bar-type devices, rotating-type devices, and sliding-type devices.

All three types of these electronic devices have the same following problems. When a user wants to watch a display of the electronic device that is resting on a table, they must use external support to hold the electronic device in a tilted position to give the display a better viewing angle. Alternatively, the user may hold the electronic device with his hands to get the proper viewing angle, however, it may become uncomfortable after a long time of viewing.

Therefore, there is room for improvement within the art.

BRIEF DESCRIPTION OF THE DRAWINGS

Many aspects of the present sliding and tilting mechanism and the portable electronic device can be better understood with reference to the following drawings. The components in the various drawings are not necessarily drawn to scale, the emphasis instead being placed upon clearly illustrating the principles of the present sliding and tilting mechanism and the portable electronic device. Moreover, in the drawings, like reference numerals designate corresponding parts throughout the diagrams.

DETAILED DESCRIPTION

Figure 1:
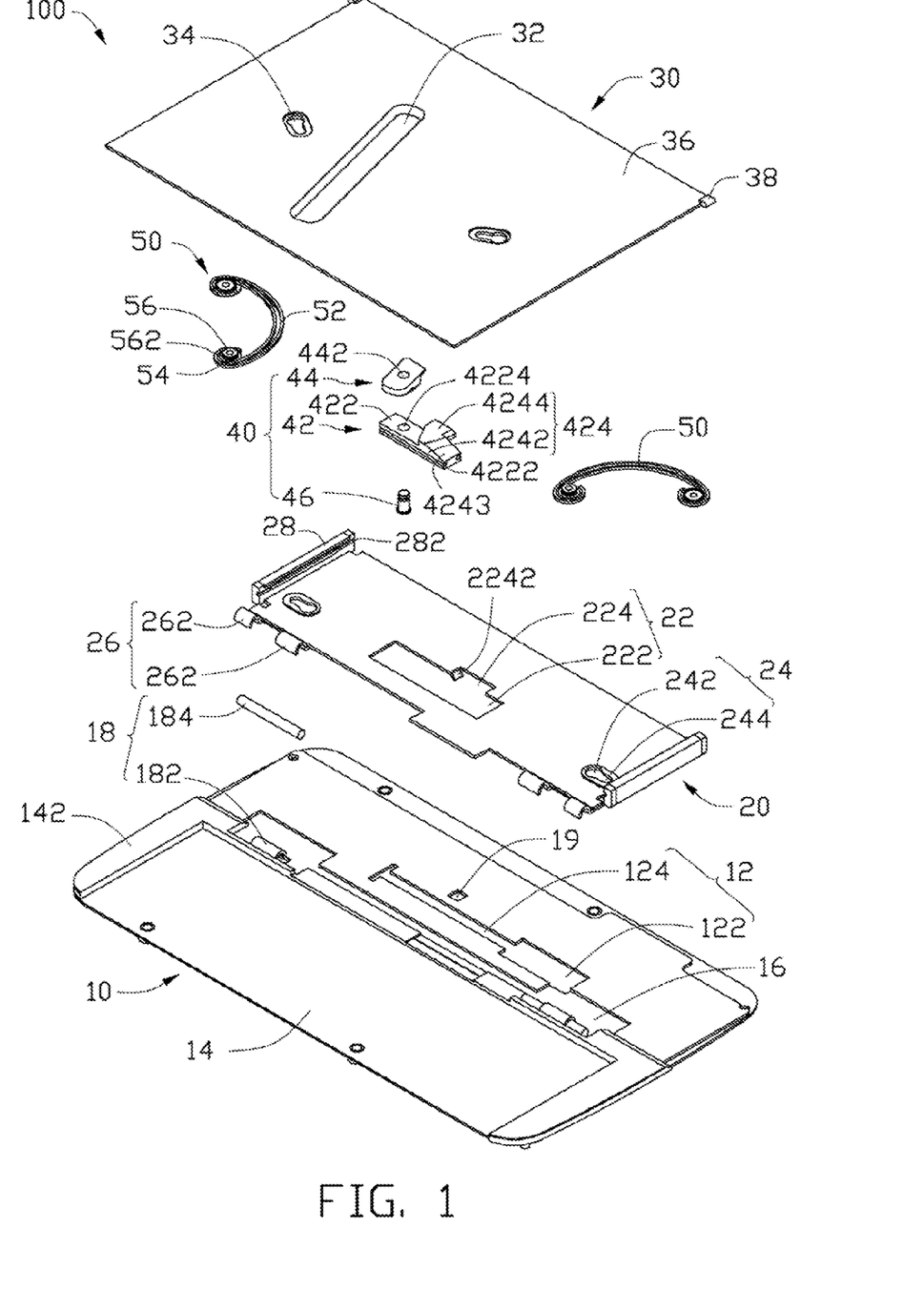
FIG. 1 is an exploded isometric view of an exemplary embodiment of a sliding and tilting mechanism.

FIG. 1 shows a sliding and tilting mechanism 100 including a lower board 10, an intermediate board 20, an upper board 30, a tilting assembly 40 and two elastic assemblies 50.

The lower board 10 defines a fixing slot 12, a mounting cavity 14, two engaging grooves 16 and a receiving hole 19.

The fixing slot 12 extends substantially laterally and includes a first slot section 122 and a second slot section 124. The second slot section 124 is smaller than and communicates with the first slot section 122. The first slot section 122 receives the tilting assembly 40. The rectangular mounting cavity 14 is positioned at the side of the fixing slot 12 for mounting a keypad module (not shown). The two engaging grooves 16 are located at opposite sides of the fixing slot 12. The two engaging grooves 16 receive two hinge assemblies 18 abutting the mounting cavity 14. Each hinge assembly 18 includes a hinge barrel 182 and a hinge pin 184 rotatably received in the hinge barrel 182. The hinge barrel 182 secures to the lower board 10. The receiving hole 19 is defined at the side of the second slot section 124 for engaging the intermediate board 20.

The intermediate board 20 defines an engaging hole 22 and two first mounting holes 24. The engaging hole 22 is substantially positioned at the center of the intermediate board 20, and includes a first engaging section 222 and a second engaging section 224. The first engaging section 222 has substantially the same width as the first slot section 122. The second engaging section 224 communicates with the first engaging section 222. The first engaging section 222 and the second engaging section 224 cooperate and are engagably mounted with the tilting assembly 40. The second engaging section 224 receives a slanted bendable portion 2242. The bendable portion 2242 is for inserting into the receiving hole 19. The two first mounting holes 24 are located at opposite corners of the intermediate board 20.

Each first mounting hole 24 includes a first hole section 242 and a second hole section 244 communicating with the first hole section 242. The intermediate board 20 has opposite clasping members 26 projecting from the flange and adjacent to the first mounting hole 24. Each clasping member 26 includes two spaced-apart substantially parallel clasping portions 262 for clasping the hinge pin 184. The intermediate board 20 has two sliding rails 28 formed on its opposite sides. Each sliding rail 22 defines a sliding groove 282 for slidably engaging the upper board 30.

Figure 2:
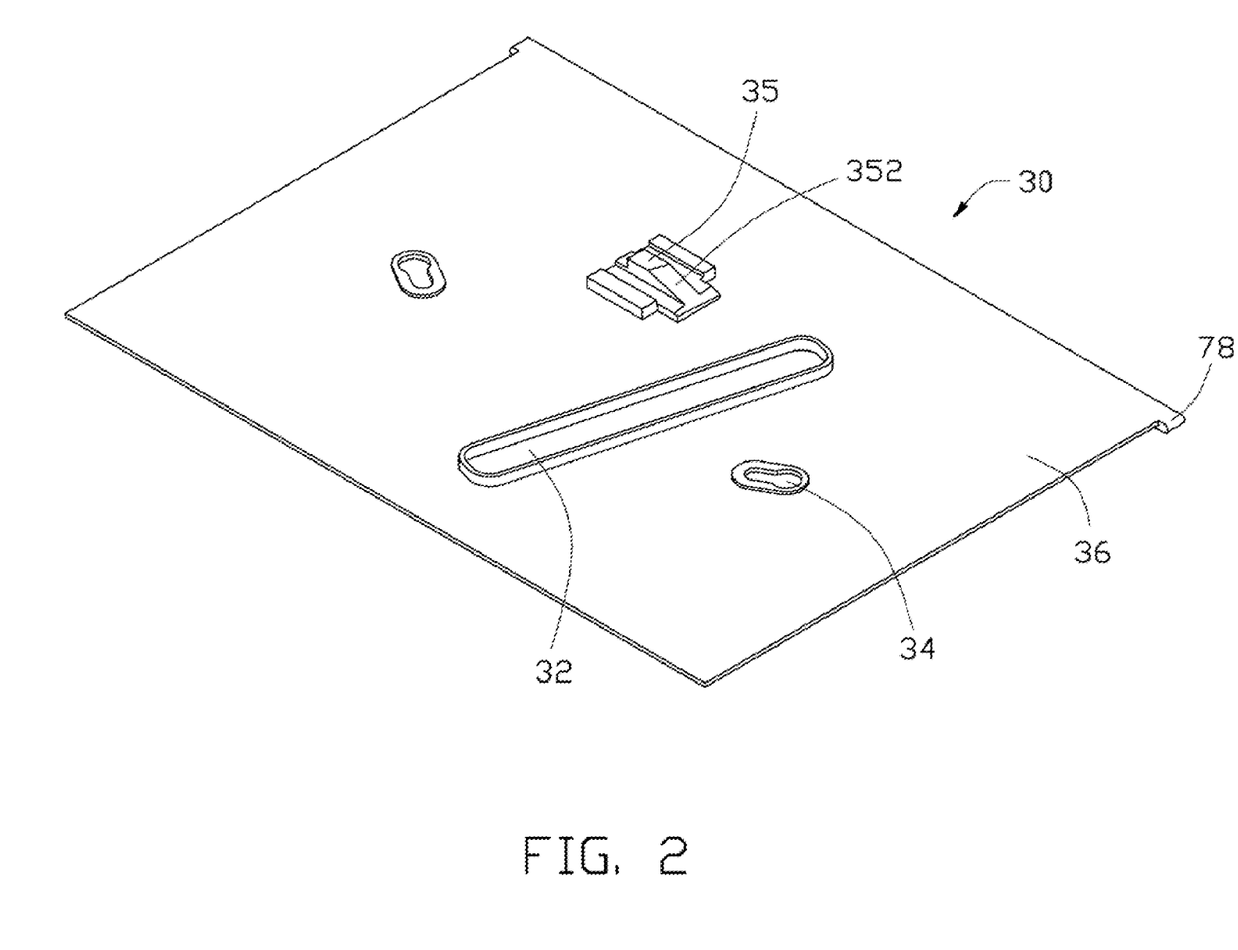
FIG. 2 is another isometric view of an upper board shown in FIG. 1.

The upper board 30 defines a guiding groove 32 and two second mounting holes 34. The guiding groove 32 is substantially positioned at the middle of the upper board 30 and extends lengthwise slanting towards the side ends of the upper board 30. The second mounting holes 34 have substantially the same structure as the first mounting holes 24. The two second mounting holes 34 are at opposite sides of the guiding groove 32. The upper board 30 has opposite side portions 36 for slidably engaging into the sliding grooves 282. The upper board 30 forms an engaging body 35 having an inclined tilting wall 352 adjacent to the guiding groove 32 (shown in FIG. 2). The upper board 30 has opposite blocking portions 38 at two distal corners of the side portions 36 for blocking with the sliding rails 28.

The tilting assembly 40 includes a sliding block 42, a guiding block 44 and a positioning member 46. The sliding block 42 includes a base block 422 and a protruding block 424 connecting the end of the base block 422. The base block 422 has substantially the same shape and size as the first slot section 122. The base block 422 defines opposite sliding slits 4222 at the side. The base block 422 defines a through first connecting hole 4224. The protruding block 424 includes a base portion 4242 and a projecting portion 4244. The base portion 4242 contacts the base block 422, and the projecting portion 4244 extends to the outside of the base block 422. The base portion 4242 forms an inclined tilting surface 4243 for engaging the tilting wall 352. The projecting portion 4244 has substantially the same shape and size as the second engaging section 224.

The guiding block 44 can slidably engage in the guiding groove 32. The guiding block 44 defines a second connecting hole 442. The positioning member 46 inserts and passes through the first connecting hole 4224 and the second connecting hole 442 to secure the guiding block 44 with the sliding block 42.

Each elastic assembly 50 includes two arcuate elastic strips 52, two ring coils 54 and two latching portions 56. The two elastic strips 52 have similar structures with different curved ratios, and have the same ends fixing to the ring coils 54. The elastic strips 52 and the ring coils 54 are positioned at the same plane. The latching portions 56 have substantially the same size and shape as the first hole section 242. The latching portions 56 cooperatively define an annular slit 562 having substantially the same size as the second hole section 244. The latching portions 33 rotatably engage into the ring coils 62.

Figure 3:
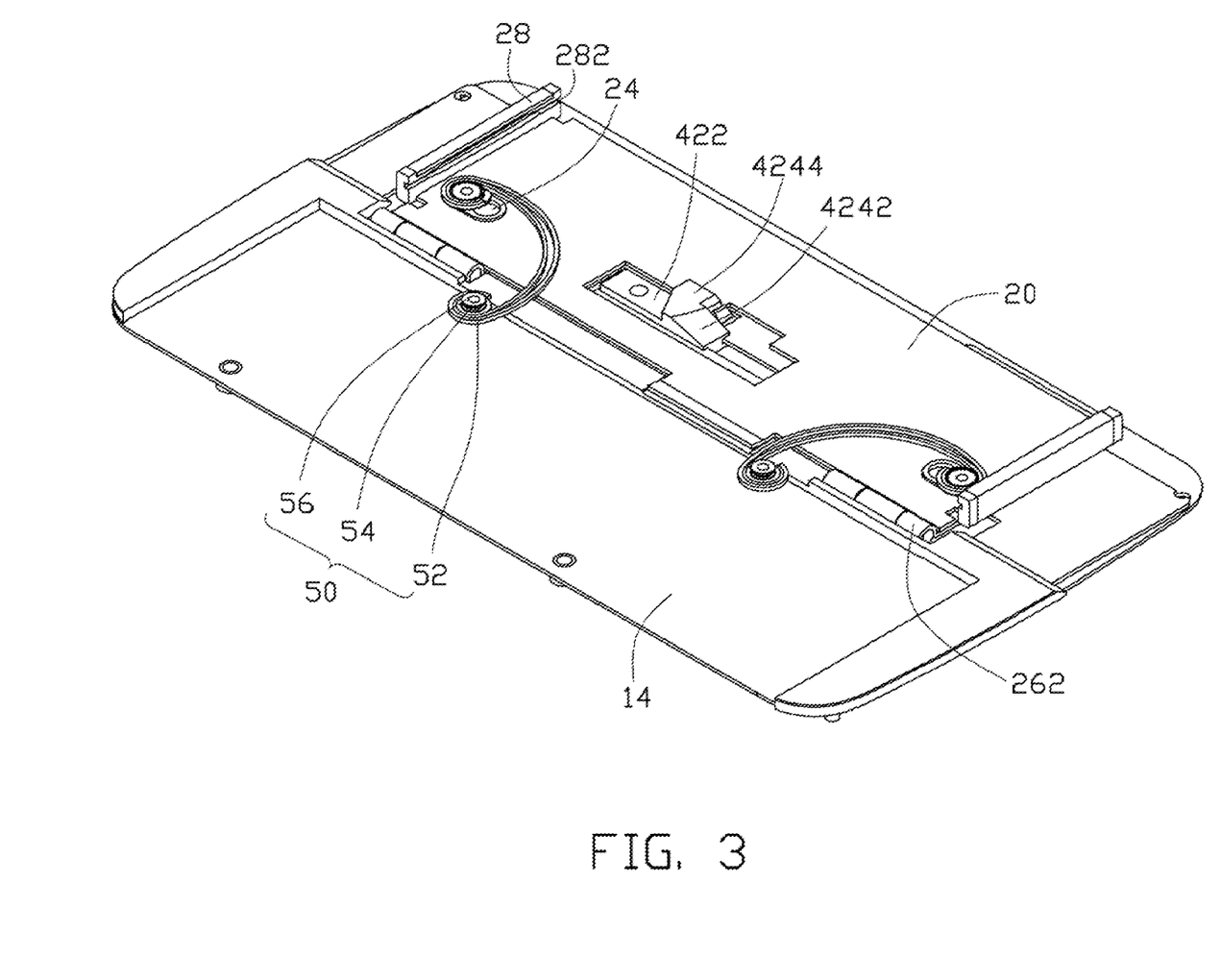
FIG. 3 is an assembled view of the sliding and tilting mechanism shown in FIG. 1 without showing the upper board.
Figure 4:
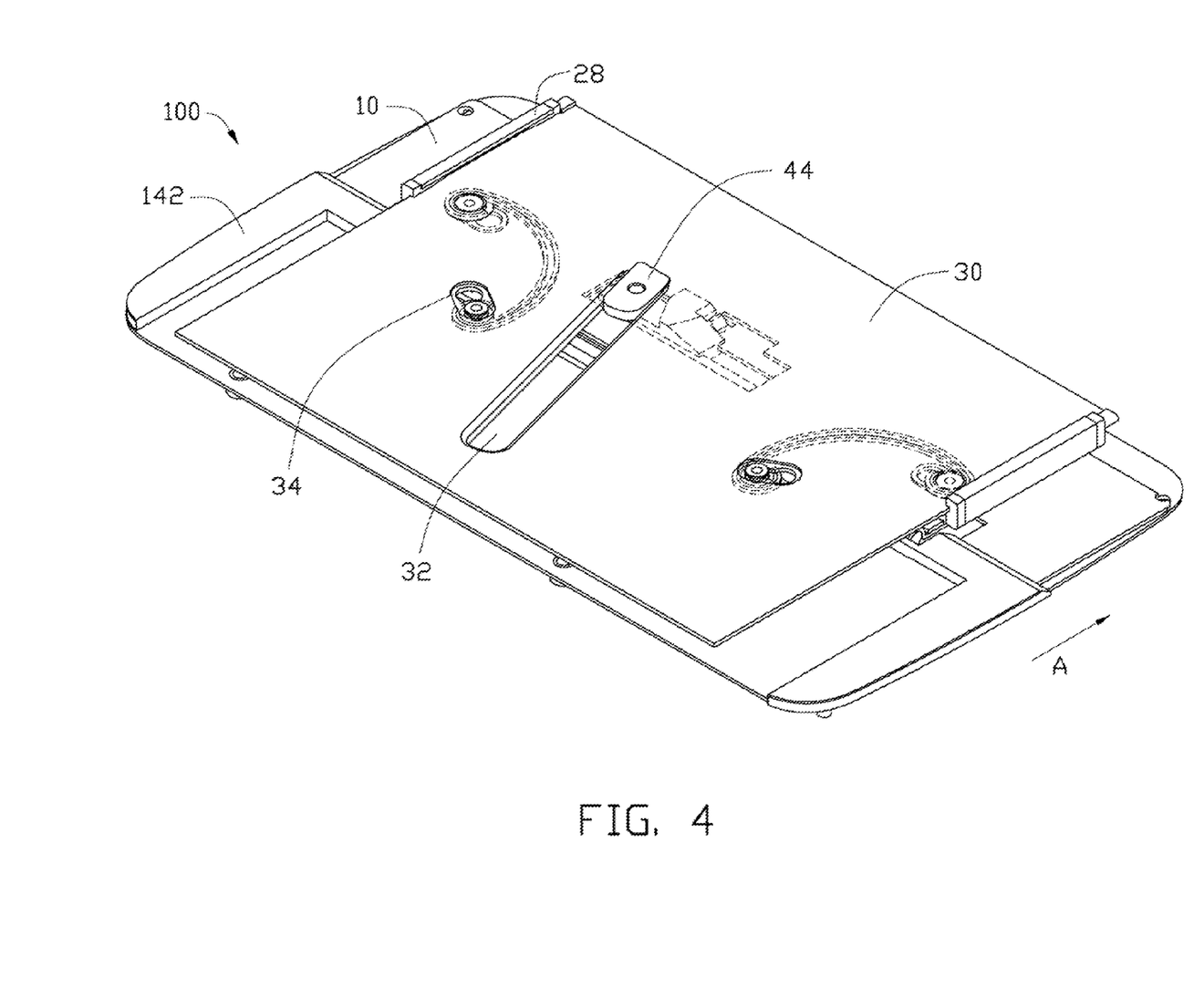
FIG. 4 is an assembled view of the sliding and tilting mechanism shown in FIG. 1 in a closed position.

FIGS. 3 and 4 show an assembly of the sliding and tilting mechanism 100. The sliding block 42 is mounted to the lower board 10. The base block 422 is received into the first slot section 122 and is pushed into the second slot section 124 to engage with the lower board 10. In this case, the opposite portions of the lower board 10 at the second slot section 124 slidably engage into the opposite sliding slits 4222.

The intermediate board 20 is mounted to the lower board 10 with the hinge pin 184 engaging through the clasping portions 262, pivotably connecting the intermediate board 20 with the lower board 10. The protruding block 424 of the sliding block 42 is engaged through the engaging hole 22. The base portion 4242 is engaged through the first engaging section 222, and the projecting portion 4244 is engaged through the second engaging section 224. At the same time, the bendable portion 2242 is accommodated in the receiving hole 19. The sliding block 42 further slides along the second slot section 124 until the projecting portion 4244 is positioned below and resists against the lower surface of the intermediate board 20, securing the intermediate board 20 between the projecting portion 4244 and the lower board 10.

The elastic assemblies 50 are mounted to the intermediate board 20 with the latching portions 56 rotatably engaging into the first mounting holes 24 of the intermediate board 20. During this process, the latching portions 56 are engaged into the first hole section 242 and are slid into the second hole section 244 with the annular slit 562 engaging the second hole section 244.

The upper board 30 is mounted to the intermediate board 20. In this process, the side portions 36 of the upper board 30 are engaged into the sliding grooves 282 of the intermediate board 20. Each elastic assembly 60 is further secured into the second mounting hole 34 of the upper board 30. After this assembly, the elastic strips 52 are slightly extended to secure the latching portions 56 within the second hole section 244. The guiding block 44 secures to the sliding block 42. The guiding block 44 slidably engages into the guiding groove 32. Accordingly, the assembly of the sliding and tilting mechanism 100 is completed.

Figure 5:
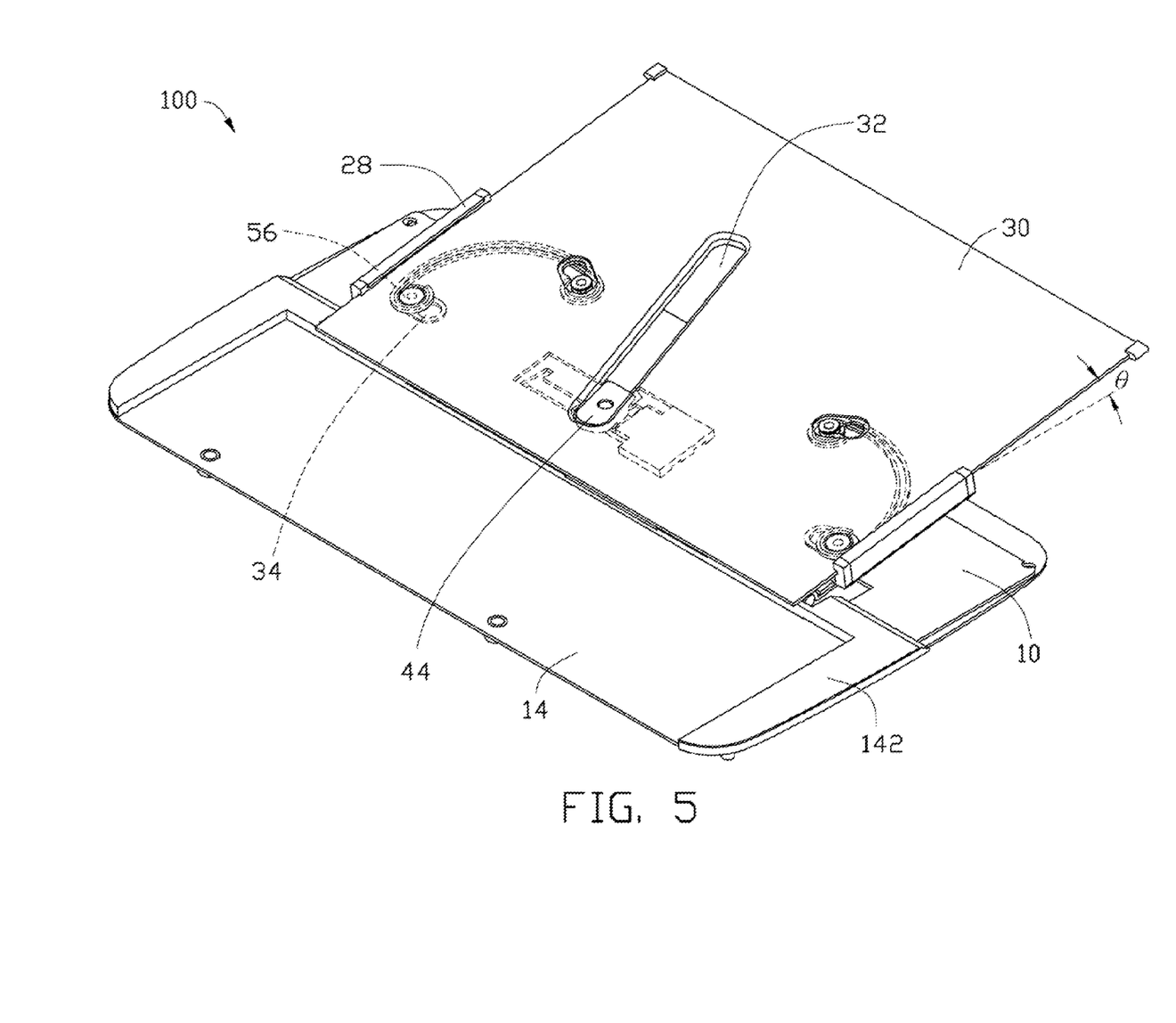
FIG. 5 is an assembled view of the sliding and tilting mechanism shown in FIG. 1 in an open position.

FIGS. 4 and 5 show the transferring of the sliding and tilting mechanism 100 from the closed position to the open position. When pushed along the arrow line A (shown in FIG. 4), the upper board 30 slides relative to the intermediate board 20 and the lower board 10. The pivotable connection of the intermediate board 20 and the lower board 10 and the resisting of the projecting portion 4244 against the lower surface of the intermediate board 20 cooperatively maintain the intermediate board 20 stationary relative to the lower board 10. Meanwhile, the sliding of the upper board 30 curves the elastic strips 52 further to accumulate potential elastic energy. The guiding block 44 slides along the guiding groove 32 and the sliding block 42 slide along the second slot section 124 towards the first slot section 122.

When the upper board 30 slides to a predetermined position, the torsions and the accumulated potential energies of the elastic assemblies 50 reach the maximum, and the tilting surface 4243 of the sliding block 42 begins to engage with the tilting wall 352 of the upper board 30. The projecting portion 4244 slides to contact and along the bendable portion 2242. When the upper board 30 slides further relative to the intermediate board 20, transferring the elastic strips 52 from the compressing process as above described to an expanding process. During the expanding process, the accumulated potential energy of the elastic assemblies 50 release to further slide the upper board 30 relative to the intermediate board 20. The sliding block 42 slides further along the second slot section 124 towards the first slot section 122. The projecting portion 4244 slides into the second engaging section 224, releasing the resisting of the projecting portion 4244 against the lower surface of the intermediate board 20. The tilting surface 4243 tilts the tilting wall 352, and the intermediate board 20 and the upper board 30 as an integral unit, rotating relative to the lower board 10 relative to the hinge pins 184.

The rotation and the tilting stop at the position to have a tilting angle $\theta$ where the guiding block 44 slides to resist against the end of the guiding groove 32, preventing the intermediate board 20 and the upper board 30 from being further tilted by an external force.

Figure 6:
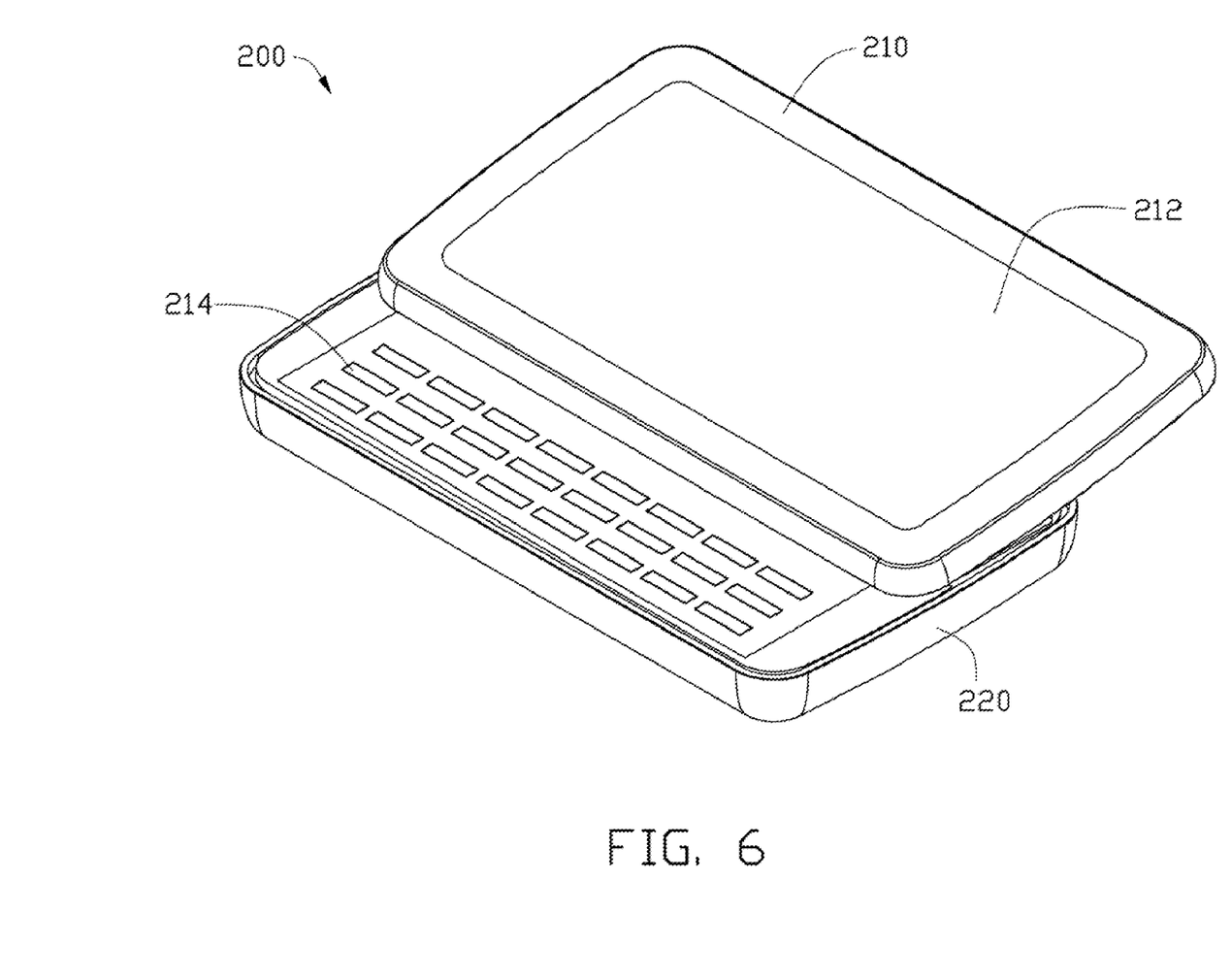
FIG. 6 is an isometric view of a portable electronic device assembled with the sliding and tilting mechanism shown in FIG. 5.

FIG. 6 shows the sliding and tilting mechanism 100 applied to a portable electronic device 200. The portable electronic device 200 includes a first part 210 and a second part 220. The first part 210 is fixed to the upper board 30 and defines a viewing interface 212. The second part 220 is fixed to the lower board 10 and defines an operation interface 214. The first part 210 can slide relative to the second part 220 over a predetermined distance by an external force and automatically tilts relative to the second part 220. The viewing interface 212 can have the tilting angle $\theta$ relative to the operation interface 214.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:
1. A sliding and tilting mechanism, comprising:
a lower board;
an upper board defining a guiding groove and forming an engaging body;
an intermediate board positioned between the lower board and the upper board, pivotably connecting with the lower board, slidably connecting with the upper board, and defining an engaging hole;
two elastic assemblies positioned between and connecting the upper board and the intermediate board for providing elastic force urging the upper board to automatically slide relative to the lower board after the upper board slides over a predetermined distance along the intermediate board; and a tilting assembly slidably mounted to the lower board, engaging through the engaging hole to slidably engage into the guiding groove, the tilting assembly configured for engaging with the engaging body after the upper board slides over the predetermined distance along the intermediate board to tilt the intermediate board and the upper board relative to the lower board, wherein the tilting assembly comprises a sliding block, a guiding block and a positioning member; the sliding block comprises a base block and a protruding block, the positioning member secures the guiding block with the base block, the base block slidably mounted to the lower board; and the protruding block extends from the base block and engaging through the engaging hole to secure with the intermediate board, the guiding block slidably engaging into the guiding groove.

2. The sliding and tilting mechanism as claimed in claim 1, wherein the base block defines opposite sliding slits, the lower board define a fixing slot, the portions of the lower board enclosing the fixing slot slidably engaging into the sliding slits.

3. The sliding and tilting mechanism as claimed in claim 1, further comprising:

the protruding block comprises a tilting surface and a projecting portion, the engaging body forms a tilting wall;

the tilting surface engaging with the tilting wall to tilt the upper board relative to the lower board;

the projecting portion configured for securing the intermediate board between the projecting portion and lower board.

4. The sliding and tilting mechanism as claimed in claim 3, wherein the engaging hole comprises a first engaging section and a second engaging section, the tilting surface engaging through the first engaging section, the projecting portion engaging through the second engaging section.

5. The sliding and tilting mechanism as claimed in claim 4, wherein the intermediate board forms a bendable portion, the bendable portion received in the second engaging section and engaging with the projection portion for limiting a tilting angle of the upper board and the intermediate board relative to the lower board.

6. The sliding and tilting mechanism as claimed in claim 1, wherein:

the intermediate board defines two first mounting holes, the upper board defines two second mounting holes with substantially the same structure with the first mounting holes;

each of the first and second mounting holes comprises a first hole section and a second hole section smaller than the first hole section;

each elastic assembly defining opposite latching portions having substantially the same shape and size as the first hole section, each latching portion defining an annular slit for latching the latching portions within the second hole section.

7. The sliding and tilting mechanism as claimed in claim 6, wherein the elastic assembly comprises two elastic strips, two ring coils and two latching portions, the elastic strips fixed to the ring coils, the ring coils and the elastic strips pivotably latching to the latching portions.

8. The sliding and tilting mechanism as claimed in claim 1, wherein the intermediate board defines opposite sliding grooves, the upper board defines opposite side portions, the side portions slidably engaging into the sliding grooves.

9. A portable electronic device, comprising:

a first part;

a second part; and a sliding and tilting mechanism comprising:

a lower board fixed to the second part;

an upper board fixed to the first part and defining a guiding groove and forming an engaging body;

an intermediate board positioned between the lower board and the upper board, pivotably connecting with the lower board, slidably connecting with the upper board, and defining an engaging hole; two elastic assemblies positioned between and connecting the upper board and the intermediate board for providing elastic force urging the upper board to automatically slide relative to the lower board after the upper board slides over a predetermined distance along the intermediate board; and a tilting assembly slidably mounted to the lower board, engaging through the engaging hole to slidably engage into the guiding groove, the tilting assembly configured for engaging with the engaging body after the upper board slides over the predetermined distance along the intermediate board to tilt the intermediate board and the upper board relative to the lower board, wherein the tilting assembly comprises a sliding block, a guiding block and a positioning member; the sliding block comprises a base block and a protruding block, the positioning member secures the guiding block with the base block, the base block slidably mounted to the lower board; and the protruding block extends from the base block and engaging through the engaging hole to secure with the intermediate board, the guiding block slidably engaging into the guiding groove.

10. The portable electronic device as claimed in claim 9, wherein the base block defines opposite sliding slits, the lower board define a fixing slot, the portions of the lower board enclosing the fixing slot slidably engaging into the sliding slits.

11. The portable electronic device as claimed in claim 9, further comprising:

the protruding block comprises a tilting surface and a projecting portion, the engaging body forms a tilting wall;

the tilting surface engaging with the tilting wall to tilt the upper board relative to the lower board;

the projecting portion configured for securing the intermediate board between the projecting portion and lower board.

12. The portable electronic device as claimed in claim 11, wherein the engaging hole comprises a first engaging section and a second engaging section, the tilting surface engaging through the first engaging section, the projecting portion engaging through the second engaging section.

13. The portable electronic device as claimed in claim 12, wherein the intermediate board forms a bendable portion, the bendable portion received in the second engaging section and engaging with the projection portion for limiting a tilting angle of the upper board and the intermediate board relative to the lower board.

14. The portable electronic device as claimed in claim 9, wherein:

the intermediate board defines two first mounting holes, the upper board defines two second mounting holes with substantially the same structure with the first mounting holes;

each of the first and second mounting holes comprises a first hole section and a second hole section smaller than the first hole section;

each elastic assembly defining opposite latching portions having substantially the same shape and size as the first hole section, each latching portion defining an annular slit for latching the latching portions within the second hole section.

15. The portable electronic device as claimed in claim 14, wherein the elastic assembly comprises two elastic strips, two ring coils and two latching portions, the elastic strips fixed to the ring coils, the ring coils and the elastic strips pivotably latching to the latching portions.

16. The portable electronic device as claimed in claim 9, wherein the intermediate board defines opposite sliding grooves, the upper board defines opposite side portions, the side portions slidably engaging into the sliding grooves.

* * * * *